June 30, 1959 L. W. DROEL 2,892,902

TELEPHONE SUBSET DUST COVER

Original Filed March 26, 1954 2 Sheets-Sheet 1

INVENTOR.
LOUIS W. DROEL

BY Henry H. Gage
AGENT

TELEPHONE SUBSET DUST COVER

Original Filed March 26, 1954 2 Sheets-Sheet 2

United States Patent Office 2,892,902

Patented June 30, 1959

2,892,902

TELEPHONE SUBSET DUST COVER

Louis W. Droel, Rochester, N.Y., assignor to General Dynamics Corporation, Rochester, N.Y., a corporation of Delaware Original application March 26, 1954, Serial No. 418,822, now Patent No. 2,769,035, dated October 30, 1956. Divided and this application September 26, 1956, Serial No. 612,250

2 Claims. (Cl. 179—159)

My invention relates to telephone subsets in general and more particularly to telephone subsets in which a dust cover for a contact set is provided in order to protect the hookswitch contacts.

In the past, dust covers have been provided for use in telephone subsets where the covers were held in place by gravity or friction. However, in subsets of the well-known cradle type, it is sometimes necessary to orient the cover so that it is inserted or placed over the contacts in a horizontal direction, and may later become loosened as the subset is used by the subscriber. Conventional dust covers have the further disadvantage in that they are arranged to accommodate mechanical actuating linkage, such as an insulating pusher controlled by the hookswitch arm, from one side only. In telephone subsets such as the one disclosed in the application of Louis W. Droel, Serial No. 418,822, filed March 26, 1954, now Patent No. 2,769,035 and of which the present application is a division, it is necessary to operate a hookswitch contact set, not only from the hookswitch arm but also from a separate, manually operated button.

Accordingly, it is an object of my invention to provide a new and improved dust cover suitable for use on telephone subset hookswitch contact sets.

Another object of my invention is to provide an improved dust cover arranged to be urged into position by tension within the contact set springs.

Another object of my invention is to provide a new and improved contact set dust cover arranged to allow access to the contact set from more than one actuating linkage member.

Further objects and advantages of my invention will become apparent as the following description proceeds, and the features of novelty which characterize my invention will be pointed out with particularity in the claims annexed to and forming a part of this specification. For a better understanding of my invention, reference may be had to the accompanying drawings, of which—

Figure 1:
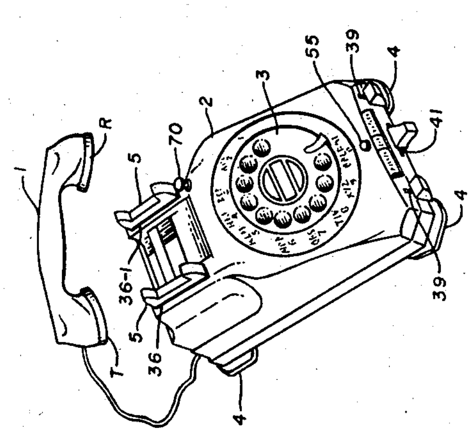
Fig. 1 shows a three-quarter view of the assembled telephone subset embodying the principle of my invention.

Referring to the drawings, a subset embodying my invention may be employed in a telephone system comprising a plurality of telephones such as the one shown in the drawing. The subset comprises handset 1 and a base portion comprising subset base 6 and the equipment which it carries, all of the base portion being covered by shell assembly 2.

Figure 2:
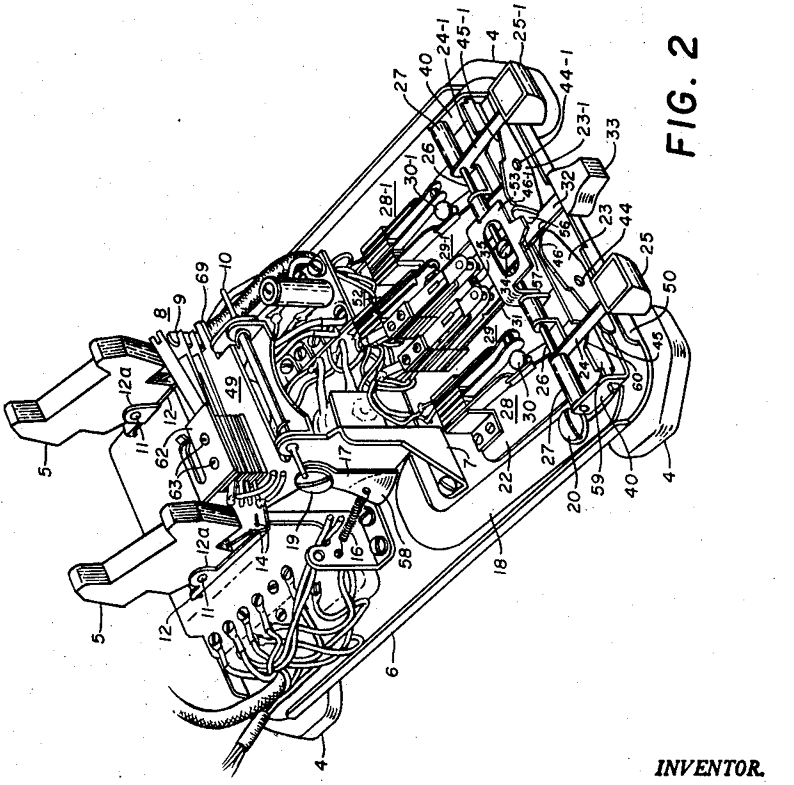
Fig. 2 is a three-quarter view of the subset of Fig. 1 with the shell and dial assemblies removed showing the multi-position connecting switch and the holding mechanism in relation to the hookswitch control mechanism.
Figure 3:
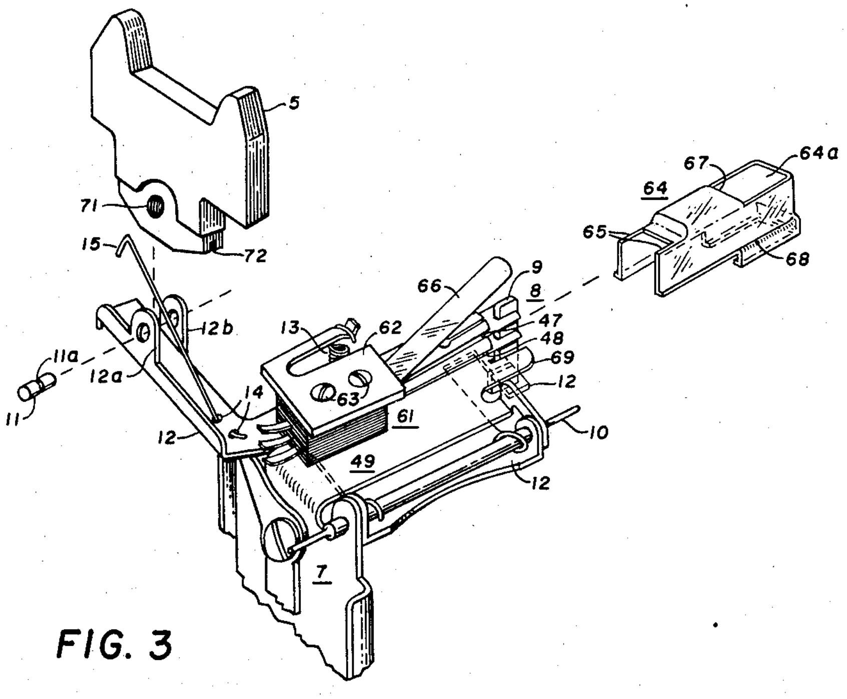
Fig. 3 is an exploded view of a portion of the subset shown in Fig. 2 showing details of the hookswitch control mechanism.

Referring to Figs. 2 and 3, a hookswitch contact set is incorporated in spring stack 8 which is carried within the subset on the plate portion 49 of hookswitch support 7 which is in turn carried by base portion 6. The component springs of stack 8, all of which are fixed at one end and free to move at the other, are held physically and electrically separated from each other and from the subset at their fixed ends by insulating separator blocks. The assembled springs and separator blocks are compressed together and held against the plate portion 49 by means of clamping plate 62 which is urged toward the stack by means of screws 63. Clamping plate 62 overhangs the edges of stack 8 for reasons to be pointed out hereinafter.

Referring to the hookswitch springs as shown in Fig. 3, dust cover assembly 64 comprising a substantially rectangular shell covers the free end of the hookswitch contact stack 8. In order to position shell 64 with respect to stack 8, positioning means comprising the extensions 65 at one end of the shell which are received between mounting plate 49 and the previously mentioned overhanging portion of clamping plate 62 and slotted portions 68 at the other end of assembly 64 which embrace the extended portion 69 of plate 49 are provided. The shell assembly 64 is retained in its position relative to the stack by means comprising top spring 66 which emerges from the opening 64_a_ in the top of assembly 64 and bears against surface 67 thereby urging assembly 64 inwardly toward the fixed end of contact stack 8.

Means for controlling the movement of the springs comprising pusher 9 is carried by a part of the springs at their free ends in stack 8, the latter springs being movable under the control of pusher 9, preferably made of insulating material, to close and open contacts 47 and 48 as pusher 9 is raised and lowered, respectively.

Manually operable means comprising lever 12 for controlling movement of pusher 9 (and, consequently, for controlling the hookswitch contacts 47 and 48) is pivotally or rotatably attached to support 7 by means of pin 10. Lever 12 in turn carries telephone receiving means comprising a pair of cradle pieces 5 which are pivotally attached to lever 12 by means of pins 11, each pin passing through axially aligned bores in spaced-apart ears 12_a_ and 12_b_ normal to lever 12 and through opening 71 through each cradle piece 5, the latter being positioned between ears 12_a_ and 12_b_.

With shell 2 in its assemblied position with respect to base 6, each of cradle pieces 5 passes through one of the pairs of openings 36 and 36–1 in shell 2 and is guided by the walls of the openings as lever 12 is rotated about pin 10.

A biasing spring 13 fixed at one end to clamping plate 62 and at the other end to lever 12 urges lever 12 to rotate upwardly about its axis of rotation during the time the telephone 1 is removed from cradle pieces 5. The contacts in stack 8 are said to be in "operated" condition when telephone 1 is removed from the cradle pieces 5 and lever 12 is in its upper position. Similarly, contact stack 8 is said to be in "normal" condition when lever 12 is moved downwardly against the tension of spring 13 by the weight of telephone 1 resting on cradle pieces 5.

In applications for which the present subset is contemplated, it is desirable to provide at each subset means for sending flashing supervision on the line to which the subset is connected. Ordinarily, the hookswitch set is controlled by cradle pieces 5 and lever 12 so that momentarily manually depressing the cradle pieces 5 would be sufficient to carry out this flashing function; however, this is not practical in a system using a subset having features of the type set forth in the aforementioned Droel application, since operation of the hookswitch for flashing purposes is also operative to release a holding condition established at the subset. Thus, it is necessary to provide suitable means for operating the hookswitch contact set which is independent of the above-described hookswitch mechanism which includes lever 12 and cradle pieces 5.

Such auxiliary hookswitch contact control means includes topmost spring 66 of the spring stack 8 extending through the opening 64a in dust cover assembly 64 and flashing plunger 70, which is in turn carried by shell assembly 2. Plunger 70 is positioned in shell assembly to engage spring 66 and to move spring 66 against the upper end of pusher 9. Pusher 9 in turn, drives the springs in stack 8 between the "normal" and "operated" conditions described above.

While I have shown and described my invention as applied to a specific embodiment thereof, other modifications will readily occur to those skilled in the art. I do not, therefore, desire my invention to be limited to the specific arrangement shown and described, and I intend in the appended claims to cover all modifications within the spirit and scope of my invention.

What is claimed is:

1. In a telephone hookswitch contact assembly, a contact stack comprising a plurality of springs, said stack having fixed and movable portions, a mounting plate, means comprising a clamping plate for securing said fixed portion of said stack to said mounting plate, a substantially rectangular shell having first and second ends for covering said movable portion of said stack, means comprising extensions of the sides of said shell at said first end for embracing said fixed portion of said stack and engaging said clamping plate for positioning said shell with respect to said stack, an opening in the top of said shell, the top spring of said plurality of springs emerging through and bearing against an edge of said opening for urging said shell towards said fixed portion of said stack thereby retaining said shell over said movable portion of said stack.

2. In a telephone hookswitch contact assembly, a contact stack comprising a contact set consisting of a plurality of flat contact bearing springs, said stack having fixed and movable portions, a mounting plate, means comprising a clamping plate for securing said fixed portion of said stack to said mounting plate, means comprising a pusher carried by said movable portion of a part of said springs for controlling said contact set, a substantially rectangular shell having first and second ends for covering said movable portion of said stack, means comprising extensions of the sides of said shell at said first end embracing said fixed portion of said stack and engaging said clamping plate and slots in said second end of said shell engaging said mounting plate for positioning said shell with respect to said stack, an opening in the top of said shell, the top spring of said plurality of springs entering said opening, said top spring being operable for controlling said pusher and bearing against an edge of said opening for urging said shell towards said fixed portion of said stack thereby retaining said shell over said movable portion of said stack.

References Cited in the file of this patent

UNITED STATES PATENTS 2,810,792 Sargisson -------------- Oct. 22, 1957